(12) United States Patent
Sumroy

(10) Patent No.: US 10,195,967 B2
(45) Date of Patent: *Feb. 5, 2019

(54) APPARATUS FOR ADAPTING A SEATBELT FOR A CHILD

(71) Applicant: Carfoldio LTD., Raanana (IL)

(72) Inventor: Jon Sumroy, Raanana (IL)

(73) Assignee: CARFOLDIO LTD., Raanana (IL)

( * ) Notice: Subject to any disclaimer, the term of this patent is extended or adjusted under 35 U.S.C. 154(b) by 125 days.

This patent is subject to a terminal disclaimer.

(21) Appl. No.: 15/163,176

(22) Filed: May 24, 2016

(65) Prior Publication Data

US 2016/0264025 A1 Sep. 15, 2016

Related U.S. Application Data

(63) Continuation-in-part of application No. 14/131,611, filed on Jan. 8, 2014, now Pat. No. 9,376,088, which (Continued)

(30) Foreign Application Priority Data

May 28, 2013 (WO) .................. PCT/IL2013/050454

(51) Int. Cl.
*B60N 2/28* (2006.01)
*B60R 22/10* (2006.01)
*B60R 22/18* (2006.01)

(52) U.S. Cl.
CPC ......... *B60N 2/2812* (2013.01); *B60N 2/2866* (2013.01); *B60R 22/105* (2013.01);
(Continued)

(58) Field of Classification Search
CPC ................ B60N 2/2812; B60N 2/2866; B60N 2002/2818; B60N 2002/2896
See application file for complete search history.

(56) References Cited

U.S. PATENT DOCUMENTS 3,136,579 A 6/1964 Hunter
3,265,438 A 8/1966 Regan
(Continued)

FOREIGN PATENT DOCUMENTS

CZ 2007466 7/2007
DE 202004 010469 9/2004
(Continued)

OTHER PUBLICATIONS

Vakiinina & Partners, Russian Search Report regarding PCT/IL2013/050454, (2014/150424), dated Jan. 1, 2016.
(Continued)

*Primary Examiner* — Timothy J Brindley
(74) *Attorney, Agent, or Firm* — Robert G. Lev

(57) ABSTRACT

Apparatus for adapting an adult three-point seatbelt for securing a child, the seatbelt comprising a belt extending from above the shoulder to an anchor point connected to chassis of vehicle, and a clasp attached to the chassis on opposite side of an occupant of the seat, such that the belt may be drawn downwards and across the occupant to engage the clasp, thereby restraining the occupant with both sash and lap sections of the seatbelt, the apparatus comprising: a mat with side catches for engaging the lap section of the seatbelt and holding it down over the legs of the child, and a strap fixed to the mat and having a clip at a distal end thereof, for extending behind the child, and the clip for clippably engaging the belt extending from the drum, to bring the sash section of the belt down, over the shoulder of the child.

12 Claims, 10 Drawing Sheets

Related U.S. Application Data is a continuation-in-part of application No. 29/516,718, filed on Feb. 5, 2015, now Pat. No. Des. 788,478.

(60) Provisional application No. 61/652,338, filed on May 29, 2012.

(52) U.S. Cl.
CPC ............... *B60N 2002/2818* (2013.01); *B60N 2002/2896* (2013.01); *B60R 2022/1818* (2013.01)

(56) References Cited

U.S. PATENT DOCUMENTS

| | | | |
|---|---|---|---|
| 3,380,775 A | | 4/1968 | Offenbacher |
| 3,547,489 A | | 12/1970 | Grieser |
| 4,231,613 A | | 11/1980 | Jonasson |
| 4,291,915 A | * | 9/1981 | Cox .................. B60N 2/2866 190/8 |
| 4,461,510 A | | 7/1984 | Cunningham |
| 5,308,116 A | | 5/1994 | Zawisa |
| 5,468,020 A | * | 11/1995 | Scime ................. B60N 2/2803 280/801.1 |
| 5,568,020 A | | 10/1996 | Kaneko et al. |
| 5,609,367 A | | 3/1997 | Eusebi |
| 5,733,004 A | | 3/1998 | Krevh |
| 5,797,654 A | | 8/1998 | Stroud |
| 5,845,967 A | | 12/1998 | Kane |
| 7,066,536 B2 | | 6/2006 | Williams |
| 7,703,806 B2 | | 4/2010 | Bell |
| 8,833,854 B2 | * | 9/2014 | Lu ........................... A47D 1/103 297/253 |
| 9,376,088 B2 | * | 6/2016 | Sumroy ................ B60R 22/105 |
| 9,789,792 B2 | * | 10/2017 | Amirault .............. B60N 2/2866 |
| 2002/0017808 A1 | * | 2/2002 | Kain .................... B60N 2/2803 297/250.1 |
| 2004/0140660 A1 | | 7/2004 | Xu |
| 2009/0014619 A1 | | 1/2009 | Wang |
| 2012/0019033 A1 | * | 1/2012 | Kelly ................... B60N 2/2806 297/250.1 |
| 2012/0080917 A1 | * | 4/2012 | Miller ................. B60N 2/2812 297/250.1 |
| 2012/0119479 A1 | * | 5/2012 | Parker ................. B60N 2/2809 280/807 |

FOREIGN PATENT DOCUMENTS

| | | |
|---|---|---|
| FR | 2539287 | 7/1984 |
| GB | 2208468 | 4/1989 |
| RU | 97682 | 9/2010 |
| WO | WO 9700184 | 1/1997 |

OTHER PUBLICATIONS

ABK Patent Attorneys, European Search Report regarding PCT/IL2013050454, dated Dec. 8, 2015.

\* cited by examiner

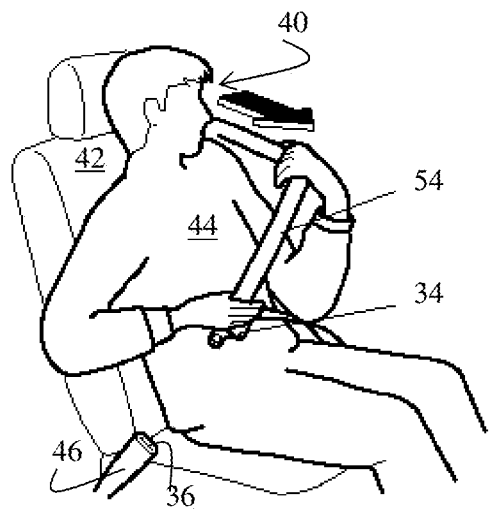
Fig. 2a PROR ART
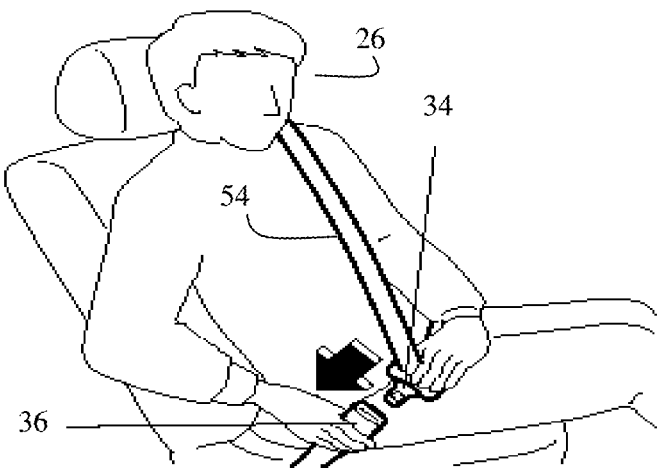
Fig. 2b PRIOR ART

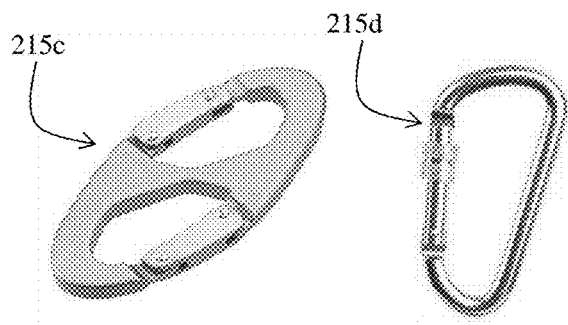
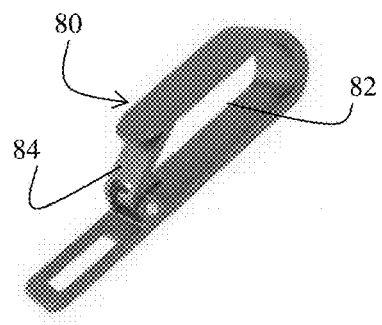
Fig. 7a  Fig. 7b  Fig. 7c
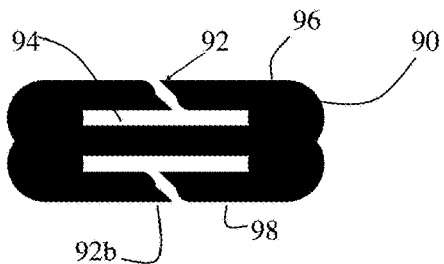
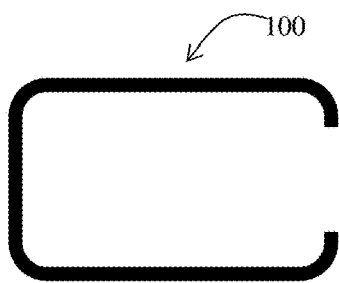
Fig. 7d  Fig. 7e
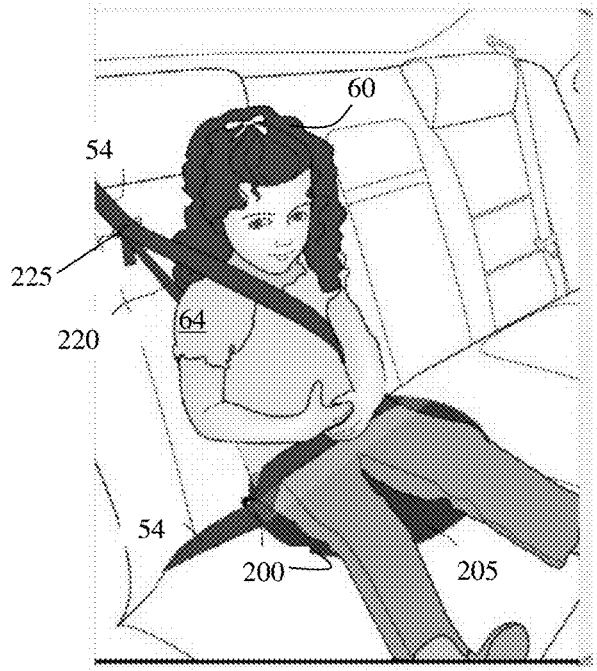
Fig. 8

APPARATUS FOR ADAPTING A SEATBELT FOR A CHILD

PRIORITY INFORMATION

The subject application claims priority as a Continuation-In-Part Application of U.S. Utility patent application Ser. No. 14/131,611, filed on Jan. 8, 2014. The subject application also claims priority from U.S. Design patent application Ser. No. 29/516,718, filed on Feb. 5, 2015; PCT Application No: PCT/IL2013/050454, filed on May 28, 2013; and, U.S. Provisional Patent Application No. 61/652,338, filed on May 29, 2012.

BACKGROUND

Seat belts, also known as safety belts, are safety devices designed to secure and restrain the occupant of a vehicle, preventing harmful movement during a collision or a sudden stop. The seat belt reduces the likelihood of death or serious injury in traffic collisions by (a) reducing the force of secondary impacts between the occupant and interior surfaces of the vehicle, (b) preventing the occupant being ejected from the vehicle in a crash, and (c) keeping the occupant positioned correctly for maximum effectiveness of airbags where provided.

Seat belts come in various types, including lap restraints or lap belts, sash belts or three point seatbelts combining the lap belt and the sash belt into a unitary device.

Lap belts fasten across the lap of the occupant. These were the earliest type of seat belt, and are still standard in passenger seats of airplanes. The full force of an impact is absorbed along a relatively small area across the waist of the occupant and may cause damage to internal organs. A "sash" or shoulder harness is a strap that goes diagonally over the vehicle occupant's outboard shoulder and is buckled inboard of his or her lap. The sash belt restrains the occupant over a larger area than the lap belt. The sash belt may attach to the lap belt tongue, or it may have a tongue and buckle completely separate from those of the lap belt.

The 3-point belt is similar to the combination of separate lap and sash belts, but is provided as a single unit. Like the separate lap-and-sash belt, in a collision the 3-point belt spreads out the energy of the moving body over the chest, pelvis, and shoulders.

In most road vehicles, the three point seat belt is now standard. It comprises a tough strip of material, typically woven nylon, which is fastened to the car below the height of the seat on one side of the passenger, and is wound onto a spring loaded reel or drum that is above shoulder height or at least is threaded over a pulley that is above shoulder height and then drawn down to a drum or real that takes up spare seatbelt. Typically, a buckle that is coupled to the seatbelt is pulled down, across the passenger, from the shoulder to the other side of the passenger near the passenger's waist, where it engages a clasp provided for that purpose. Typically, pressure on a release lever on the clasp, releases the buckle, and the drum winds the belt up. In some models, the seatbelt itself is pulled down and across the occupant and is shackled by a releasable rod or loop.

Such seatbelts restrain the seated passenger with a strap that crosses the thighs from where a fixed end of the seatbelt is fastened to the chassis on one side, through an eye of a slider that is provided with a buckle that is slid into and held by the clasp, and then up across the body and over the shoulder to the reel or pulley wheel.

On impact or sudden stopping, the reel jams and prevents the seatbelt from being pulled out further, and typically is configured to retract the seatbelt. Such seat belts are reliable, convenient, and easily implemented to restrain the passenger, and easily released to allow the passenger to exit the vehicle.

Seatbelts are mandated by law in many countries, for both front-seat and back-seat passengers of many vehicles. In some jurisdictions passengers in taxicabs and the like, are not required to wear seatbelts, but the safety advantages of so doing are nevertheless clear.

Until the 1980s, three-point belts were commonly available only in the front outboard seats of cars; the back seats were only often fitted with lap belts. Evidence of the potential of lap belts to cause separation of the lumbar vertebrae and the sometimes associated paralysis, or "seat belt syndrome", led to progressive revision of passenger safety regulations in nearly all developed countries to require 3-point belts first in all outboard seating positions and eventually in all seating positions in passenger vehicles.

Most modern seat belts are stowed on spring-loaded reels called "retractors" equipped with inertial locking mechanisms that stop the belt from extending off the reel during severe deceleration. Seatbelts in many newer vehicles are also equipped with "pretensioners" and/or "Webclamps". Pretensioners preemptively tighten the belt to prevent the occupant from jerking forward in a crash. Some systems also pre-emptively tighten the belt in fast accelerations and strong decelerations even if no crash has happened. Webclamps clamp the webbing in the event of an accident and limit the distance the webbing can spool out (caused by the unused webbing tightening on the central drum of the mechanism). These belts also often incorporate an energy management loop ("rip stitching") in which the lower part of the webbing is looped and stitched with a special stitching designed to "rip" at a predetermined load, which reduces the load transmitted through the belt to the occupant, reducing injuries to the occupant.

As with adult drivers and passengers, the advent of seat belts was accompanied by calls for their use by child occupants, including legislation requiring such use. Generally children using adult seat belts suffer significantly lower injury risk when compared to non-buckled children. Nevertheless, it will be appreciated that three point seatbelts are standard fixtures that are appropriate for restraining adults of various shapes and sizes. They are, however, engineered for adults, and are thus typically too big for small children. Adult 3 point seatbelts are generally inappropriate for children since the lower strap crosses the stomach and is consequently uncomfortable and potentially dangerous, and the diagonal shoulder strap invariably misses the shoulder of a child, and interferes with his or her neck or head. However, if the seatbelt is positioned under the arm, the seatbelt rubs against the underarm and/or neck, and is uncomfortable. Positioning the seatbelt under the arm is also dangerous, in that both sections of the belt cross the lower abdomen, and an impact may cause the seatbelt to retract across the stomach, risking rupturing internal organs.

Many jurisdictions now advocate or require child passengers to use specially designed child restraints. Such systems include separate child-sized seats equipped with their own restraints and booster cushions or seats for use by children together with the adult restraints. In some jurisdictions children below a certain size are forbidden to travel in front car seats.

Child safety seats (sometimes referred to as an infant safety seat, a child restraint system, a restraint car seat, or ambiguously as car seats) are seats designed specifically to protect children from injury or death during collisions. Automobile manufacturers may integrate child safety seats directly into their vehicle's design. Most commonly, these seats are purchased and installed by consumers. Many regions require children of certain ages, weights, and/or heights to use a government-approved child safety seat when riding in a vehicle. Child safety seats provide passive restraints and must be properly used to be effective. However, many child safety restraints in countries such as Canada and the United States are not used properly. To tackle this negative trend, health officials and child safety experts produce child safety videos to teach proper car seat installation to parents and caregivers. Baby car seats are legally required in many countries, including the United States, to safely transport children up to the age of 2 or more years in cars and other vehicles.

Booster seats are recommended for children that are too big for baby seats, until they are big enough to properly use a seat belt without them. Some jurisdictions require booster seats to be used by law. Booster seats raise the child and allow the seat belt to sit firmly across the collar bone and chest, with the lap portion fitted to the hips. If the seat belt is not correctly positioned across the collar bone and hips, it will generally ride across the neck and the stomach and cause internal injuries in the event of a collision. Booster seats also facilitate the child looking out of the window and since the child is more comfortable and has better vision, are generally accepted by children. Booster seats are required by law in the US, up to the age of 9 or a weight of 90 pounds (41 Kg).

However, booster seats are large and bulky devices. Where a back seat of a vehicle is sometimes used to transport adult passengers and sometimes for transporting children, the booster has to be removed and replaced. Booster seats are space consuming and their storage in the trunk of a vehicle, minimizes the amount of groceries and other goods being transported. They are an additional expense for grandparents and other occasional drivers of children. When renting cars, booster seats may need to be rented separately, which is an additional expense, tempting parents to economize. For these and similar reasons, booster seats are often not available when required.

Vertically challenged adults may feel uncomfortable sitting on a booster, as may shorter children being transported to social events attended by taller peers.

U.S. Pat. No. 3,136,579 to Hunter, is an early example of a booster seat that raise the child to allow him or her to look out of the windows, but is bulky and cumbersome.

U.S. Pat. No. 3,380,775 to Offenbacher describes another bulky booster seat solution.

U.S. Pat. No. 3,265,438 to Regan et al. describes a pneumatically inflatable seat that can be deflated for storage. Pneumatic solutions are complicated and unreliable, and this never really caught on.

U.S. Pat. No. 3,547,489 to Grieser and U.S. Pat. No. 4,231,613 to Jonasson describe booster seats that have side loops for engaging a seat belt. The devices are fairly bulky. They are designed for the more or less obsolete lap straps, but not for a three point seatbelts.

U.S. Pat. No. 4,291,915 to Cox describes a booster that doubles up as a suitcase and can be used for storing objects therein, going someway to overcome the inherent space requiring disadvantage of booster seats. The device described is somewhat complicated and therefore expensive to manufacture, and it is not really a practical storage solution for more than its straps.

U.S. Pat. No. 4,461,510 to Cunningham, titled "Childs safety device for vehicle" describes a booster with a strap that goes behind the child and engages the shoulder strap of a three point seat belt. The strap may be adjusted in effective length for different sized children, but the width of the seat is fixed, and the leg straps may not be comfortable for children that are significantly narrower than the booster seat. Additionally, the booster seat is fairly cumbersome.

U.S. Pat. No. 5,308,116 to Zawisa, describes a device that engages the shoulder strap of a three point seatbelt at an adjustable height suitable for smaller passengers. However, the system described therein is only suitable for outside seated passengers, whereas the middle seat is actually the safest for backseat passengers. Furthermore, although offering a solution for larger children, the lap engaging section of the strap will generally be too high for smaller passengers that are, nevertheless, too large for an infant seat.

U.S. Pat. No. 5,468,020 to Scime describes an auxiliary harness that engages the seatbelt and adapts it to the child. Scime's system is different from the typical booster that raises the child, but is nevertheless, fairly bulky and thus inconvenient.

U.S. Pat. No. 5,609,367 to Eusebi et al. describes an adjustable three point restraint system that is suitable for both children and adults. It is part of the vehicle and significantly increases manufacturing costs of the vehicle. It is not retrofittable to standard vehicles provided with conventional three point seatbelts.

U.S. Pat. No. 5,733,004 to Celestina Krevh describes a fairly simple compact device for adjusting the shoulder strap of a three-point seatbelt and making it appropriate for use by a child. The device is designed for use with a booster seat. The device described is fairly compact, but when used with a booster seat, the space required for the booster seat makes the solution bulky and cumbersome and inappropriate for occasional use.

U.S. Pat. No. 5,797,654 to Stroud describes a belt buckle/tether strap for use with a booster seat that combines the advantages and disadvantages of U.S. Pat. No. 4,461,510 to Cunningham and U.S. Pat. No. 5,733,004 to Celestina Krevh.

U.S. Pat. No. 5,845,967 to Kane and U.S. Pat. No. 7,066,536 to Williams describe other bulky booster and children's seats.

WO 9700184 to Smith describes a safety belt restraint device that holds the lap belt down and has a flatter profile than the conventional booster seat. Two embodiments are described. The first one holds the belt down between the legs and over each leg separately. The second is a sort of tray that engages the seatbelt. It is appropriate for a child whose width is not much narrower than the tray. The pelvis of a smaller child will not be adequately protected.

U.S. Pat. No. 7,703,806 to Bell et al. entitled "Seat Belt System for a Motor Vehicle" describes a system for adjusting the shoulder strap to the height of the passenger. However, the lap strap remains configured to the width of an adult and is thus inappropriate for use by smaller children as it risks damage to a narrow pelvis in impact.

USSN 2012/0019033 to Kelly describes an inflatable booster. By deflating the device, it may be stowed without significantly filling storage resources needed for luggage, groceries and the like. However, as described hereinabove with reference to U.S. Pat. No. 3,265,438 to Regan et al., the inflatable system is not really practical for occasional use, by grandparents and the like. Some adults are fastidious about using the mouth nozzle to inflate a booster seat, not knowing who previous users were. Inflatable seats may take two or three minutes to inflate, and require good lungs, and are thus problematic for many people such as asthmatics, the elderly and heavy smokers, for example. Additionally, the deflated seat itself takes up space.

CZ 2007,466 describes yet another booster seat.

Despite the plethora of developments in safety harnesses and boosters, there remains a need for a compact alternative to traditional booster seats for adapting a three point adult seat belt for use by smaller passengers. Embodiments of the present invention address this need.

SUMMARY OF THE INVENTION

A first aspect of the invention is directed to an apparatus for adapting an adult three-point seatbelt of a vehicle to restrain a child, the seatbelt comprising a belt that extends from a fixture above shoulder height of an adult occupant to an anchor point attached to chassis of vehicle, such that the belt may be drawn downwards and across an occupant to restrain the occupant with a sash section of the seatbelt and a lap section of the seatbelt; the apparatus comprising: a mat with side catches for engaging the lap section of the seatbelt and for holding the lap section down over the hips of the child; a strap fixed to said mat and having a clip at a distal end thereof, the strap for extending behind the child, and the clip for clippably engaging the belt extending below the fixture, to bring the sash section of the belt down, over the shoulder of the child.

In some seatbelt systems, the fixture above the shoulder is a drum. In other systems the fixture above the shoulder is a pulley.

Many seatbelts are provided with a buckle that is mounted on a slider that is slideably adjustable along the belt and a clasp on a distal end of a flexible rod that is attached at its proximal end to the chassis, such that the buckle may be engaged by the clasp.

In some embodiments, the mat is flexible and the apparatus may be compacted for storage. Compacting may be by rolling up or by folding, for example.

In one embodiment, the mat is segmented, comprising at least two stiff sections hinged together, and the apparatus may be folded for storage.

Optionally, adjacent sections of the mat may be hinged together. In some embodiments, the adjacent sections are hinged together by cloth hinges.

Typically, the side catches are selected from the group comprising shackles, open buckles, and hooks, particularly C hooks.

Preferably, the effective length of the strap may be adjusted by a buckle.

In some embodiments, the clip comprises a locking magnetic element.

Optionally, separation of side catches is adjustable to adjust said apparatus to children of different widths.

In some embodiments, the side catches are mounted on arms that extend from said mat a variable amount.

Typically the strap comprises woven nylon. However, the strap may comprise other tough materials, such as steel, Kevlar™ or leather, for example.

In a further aspect, the present invention is directed to a car chair comprising a seat and a back, the seat further comprising side catches attached to the seat for engaging a lap section of a seat belt and directing it across thighs of an occupant, and a clip attached to the back for engaging a shoulder sash section of the seatbelt and directing it across shoulder of occupant.

In some embodiments the side catches comprise C clips detachably attachable to loops in fabric of the seat. In other embodiments the side catches comprise shackles open buckles, hooks and clips detachably attachable to loops in fabric of the seat.

In some embodiments the side catches comprise straps provided with one part of a hook and loop fabric fastener, to detachably attach to a second part of the hook and loop fastener sewn to fabric of the seat.

In some embodiments the clip attached to the back for engaging the shoulder sash comprises a loop permanently attached to fabric of the seat back.

In some embodiments the clip attached to the back for engaging the shoulder sash section comprises a strap provided with one part of a hook and loop fabric fastener to detachably attach to a second part of the hook and loop fastener sewn to fabric of the seat back.

In some embodiments the clip attached to the back for engaging the shoulder strap comprises a substantially vertical series of cloth loops permanently attached to fabric of the seat back and a detachable clip for engaging one of said cloth loops and the shoulder sash section of the seat belt.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

In the accompanying drawings:

FIG. 1a is a schematic illustration of a three point seatbelt of the prior art;

FIG. 1b is a schematic illustration of an adult size occupant of a car seat, restrained by a three point seatbelt of the prior art;

FIG. 2a shows an adult pulling a seatbelt of the prior art down and across;

FIG. 2b shows the adult of FIG. 2a buckling the seatbelt of the prior art;

FIG. 3 shows a child wearing an adult seatbelt of the prior art where the sash section rubs against the child's neck;

FIG. 4 shows a child with the seatbelt of the prior art adjusted to go under the arm;

FIG. 5 shows a child sitting on a booster seat of the prior art and raised thereby, so that the seatbelt is correctly and comfortably positioned;

FIG. 6 shows a first embodiment of the present invention, comprising a flexible roll up mat with hinged shackles for engaging the lap section of a seatbelt, and a strap with a clip for engaging the vertical section of the seatbelt, so that the sash belt correctly spans from shoulder to hip;

FIG. 7a-7e show various side catches that may be used as part of the apparatus of various embodiments for engaging the lap section of the seatbelt;

FIG. 8 shows a child sitting on mat of FIG. 6, with the shackles and clip pulling both lap strap and sash strap downwards into a comfortable position with respect to the child;

FIG. 9 is a schematic representation of a seat belt engaging system that is integral to a car chair;

Figure 10:
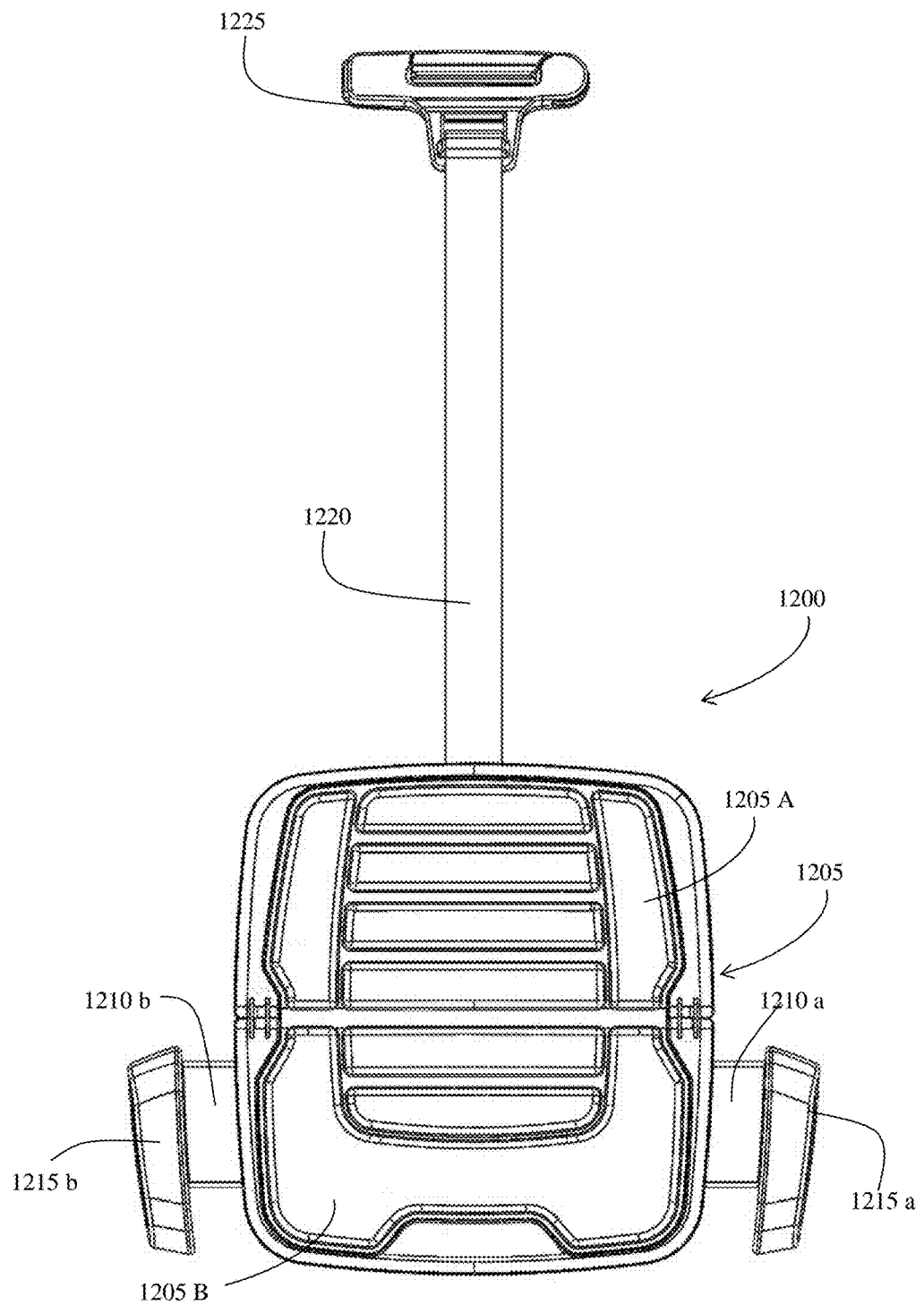
Figure 11:
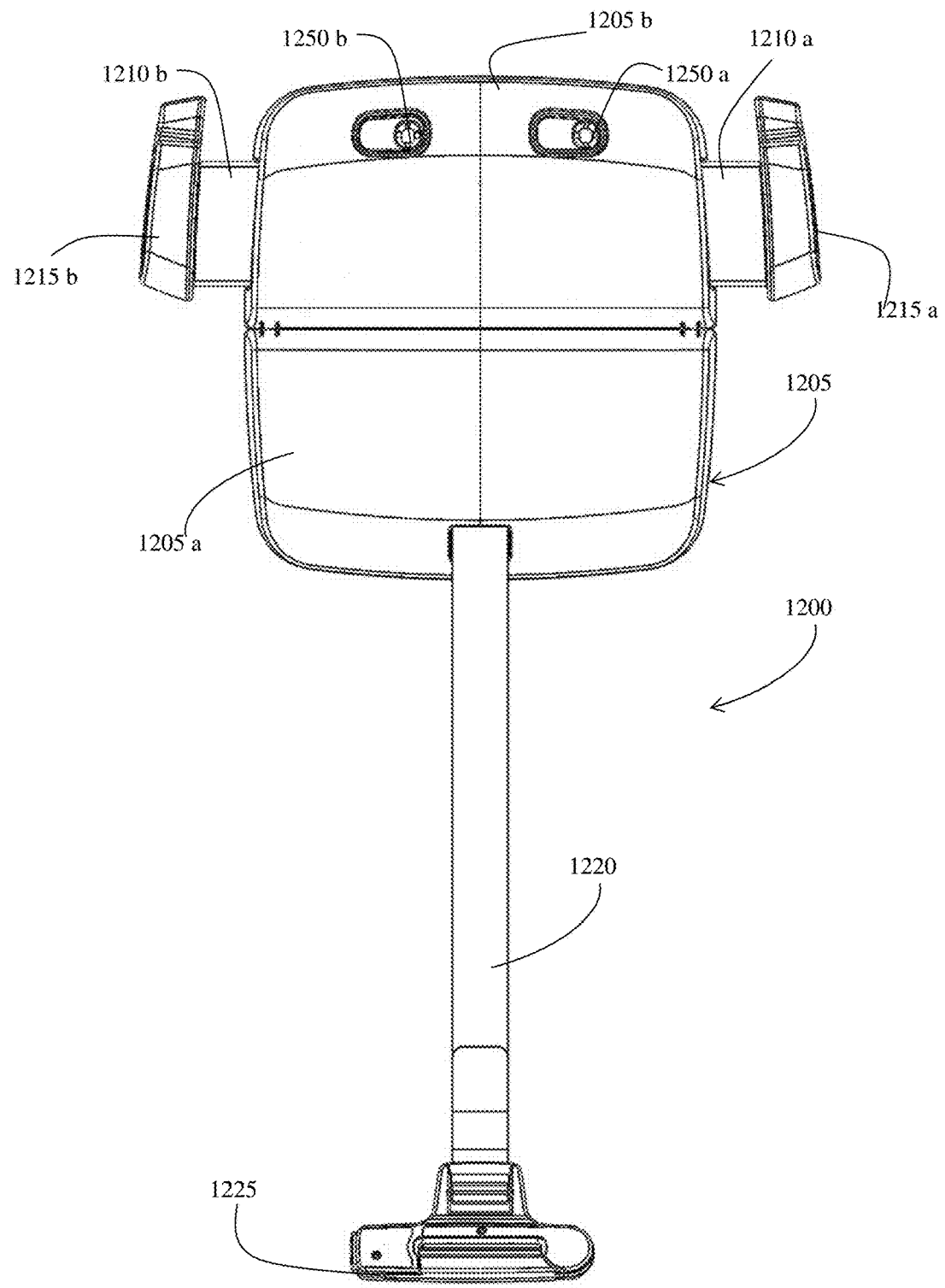
Figure 12:
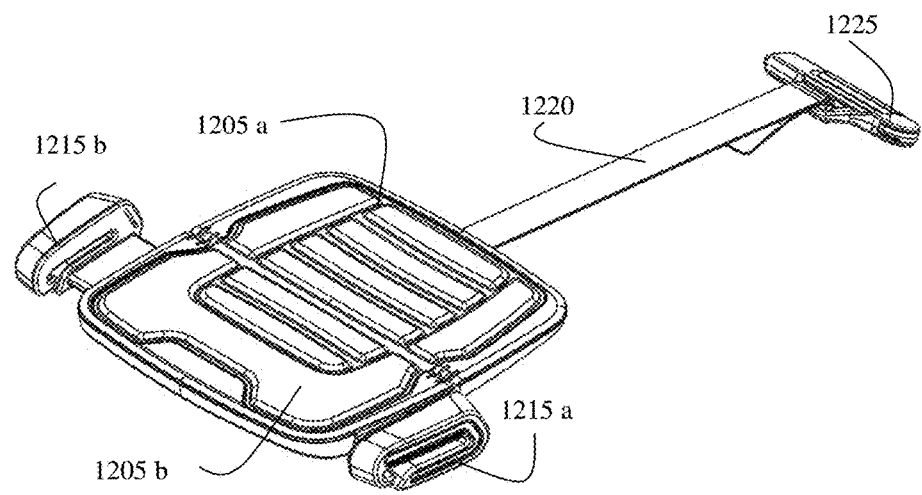
Figure 13:
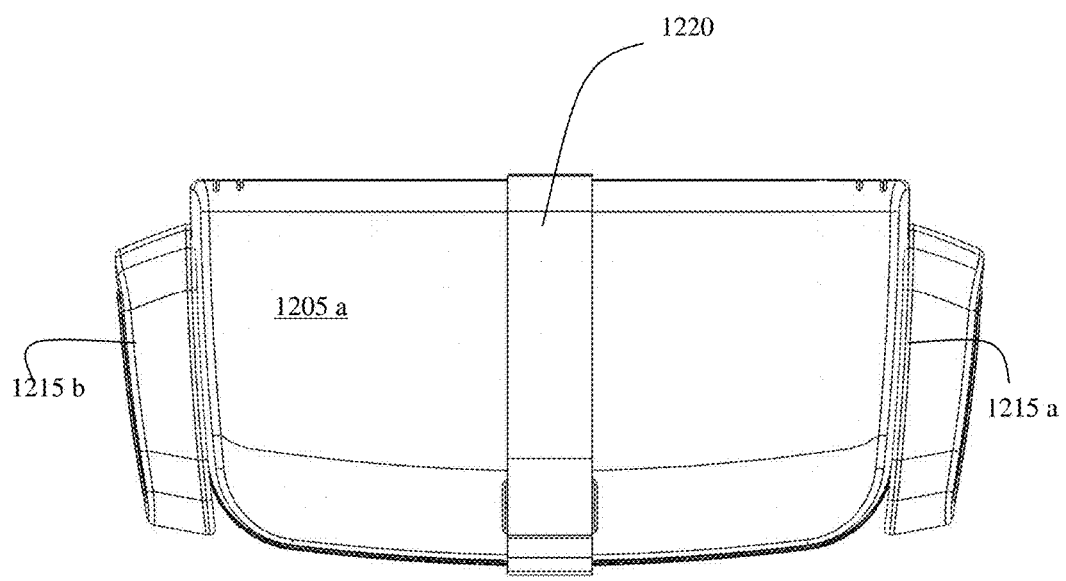
Figure 14:
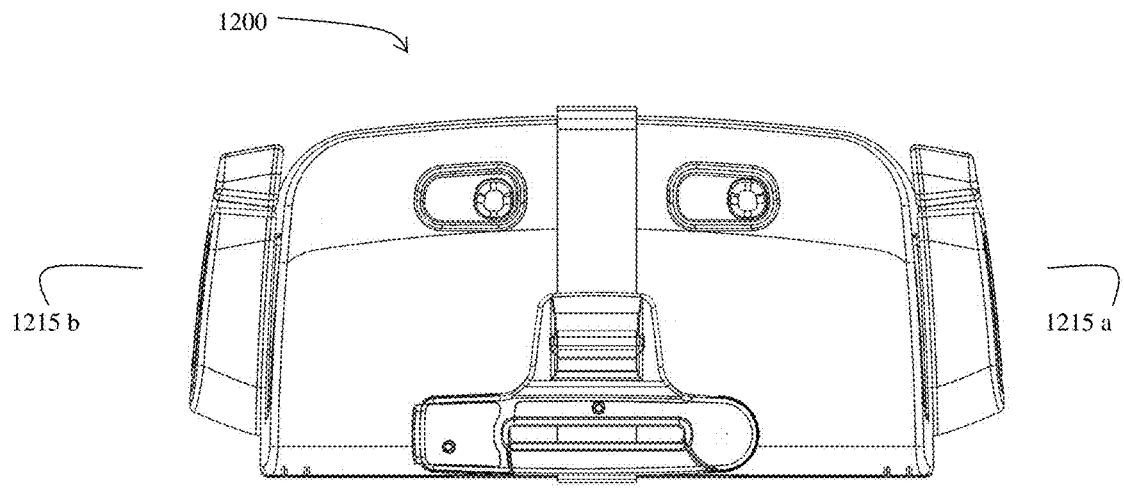
Figure 15:
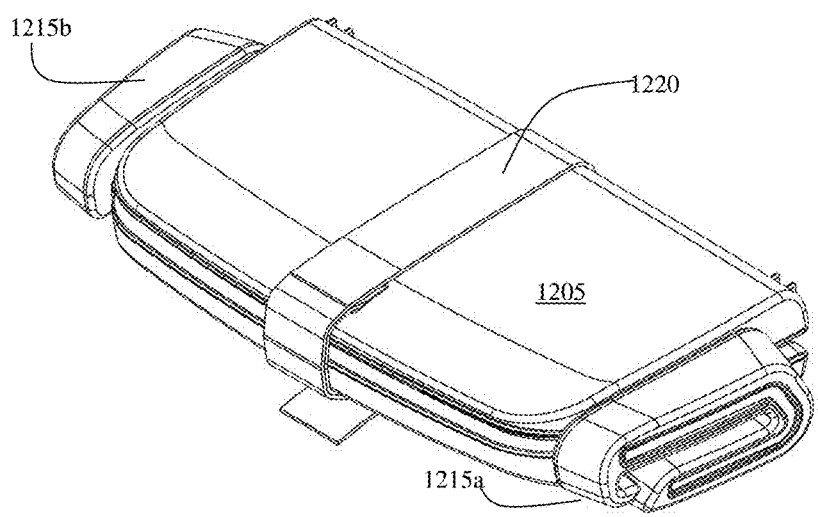

FIG. 10 shows a preferred embodiment of the invention in fully open view from above;

FIG. 11 shows the preferred embodiment of FIG. 10 in fully open view from below, showing the side catches attached to an extendible strip;

FIG. 12 shows the preferred embodiment of FIG. 10 in perspective view from the top, where the left seatbelt engaging means is in an extended position and the right seatbelt engaging means is in a closed position; open view from below;

FIG. 13 shows the preferred embodiment of FIG. 10 in fully closed view from above, with the strap wrapped around the folded rigid pad;

FIG. 14 shows the preferred embodiment of FIG. 10 in fully closed view from below showing the clip positioned on the folded pad and showing sliding locking devices for locking the extendible side arms in various extending positions, and FIG. 15 shows the preferred embodiment of FIG. 10 in fully closed perspective view, clearly showing a C shaped side catch.

DESCRIPTION OF EMBODIMENTS

Figure 1A:
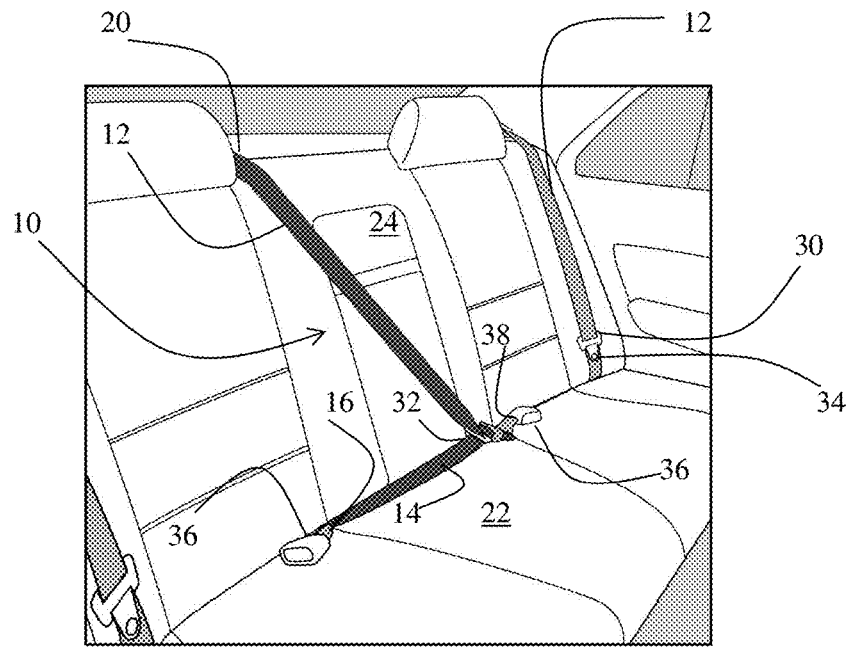
Figure 1B:
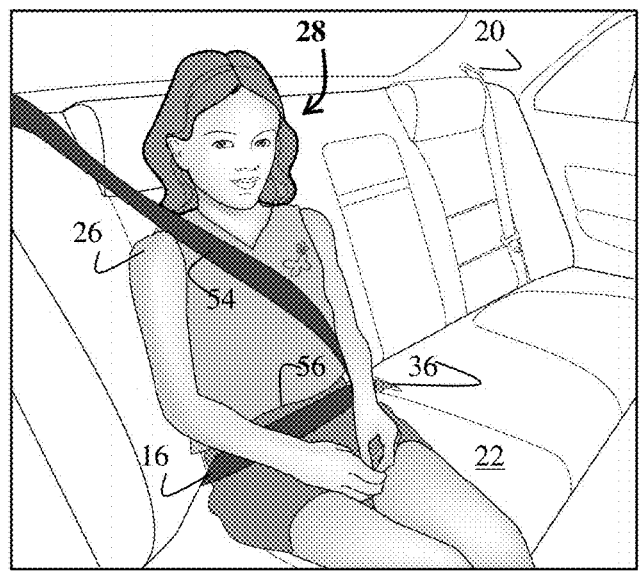

With reference to FIG. 1a, a three point seatbelt system 10 is shown. The three point seatbelt 10 consists of a seatbelt 12 of tough, flexible material, typically woven nylon, which is attached to the chassis of the car at a lower attachment point 16, typically behind the edge where the seat 22 and back 24 meet. As shown in FIG. 1b, the top end of the belt 12 goes over a fixture 20 that may be attached to the chassis of the vehicle, above shoulder height 26 of an occupant 28 sitting on the seat 22. In some vehicles, the fixture 20 is a sprung loaded reel or drum around which the seatbelt 12 is wound. In other vehicles the fixture 20 is a pulley, and the seatbelt 12 goes over and around the pulley and down to a take up reel or drum below the level of the pulley, which may be exposed or concealed behind a cover.

In many three point seatbelts systems 10, a slider 30 having a slot 32 through which the seatbelt 12 runs and a protruding tongue 34 is provided. The slider 32 can be raised or lowered along the seatbelt 12 between the lower point of attachment 16 and the fixture 20. A clasp 36 is provided, typically on a flexible rod for front or back seats, and sometimes on a strap 38 for back seats, that is fixed to the chassis of the vehicle. The clasp 36 is configured to lockingly engage the tongue 34 of the slider 30.

An occupant 28 restrained by the seatbelt system 10 of FIG. 1a is shown in FIG. 1b.

With reference to FIGS. 2a and 2b, An occupant 40 of the seat 42, sitting between the taut length of seatbelt 12, on the outer side of occupant 40 and the flexible rod 46 on the inner side of occupant 40 slides the slider 30 to a convenient position and then pulls it across and down so that the tongue 34 thereof may be inserted into the clasp 36 where it is locked in place. The seatbelt 12, thus stretches from the fixture (not shown), down, over the shoulder 26 and across the torso 44 of the occupant 40, through a slot 32 of the slider 30 attached to the tongue 34 that is lockingly engaged by the clasp 36, creating a sash strap section 54 of the seatbelt 12, and then the belt 12 goes back over the occupant's 40 lap to create a lap strap section 56 and is fixed to the lower anchor point 16.

The type of arrangement shown in FIGS. 1a, 1b, 2a, 2b is a well established solution. Commercially available three point seat-belts are widely employed and are required by regulatory authorities in many cases. A drum is often provided that keeps the seatbelt 12 taut. The slider 30 may be moved up and down the seatbelt 12. The drum may be the fixture above the occupant's shoulder, or the fixture 20 may be a pulley rod over which the seatbelt 12 is threaded, and the drum or take up reel may be positioned below the fixture 20, possibly out of sight. In some vehicles, the seatbelt 12 itself is engaged by a clasp or similar, on the inner side of the passenger, rendering the slider 30 and tongue 34 arrangement obsolete. There are also various other three-point seat belt arrangements, mutatis mutandis. These features enable the seatbelt arrangement to be easily adjusted for comfort by occupants 28, 40 of a wide variety of shapes and sizes, including, inter alia, tall, short, fat, thin, male and female occupants.

Figure 3:
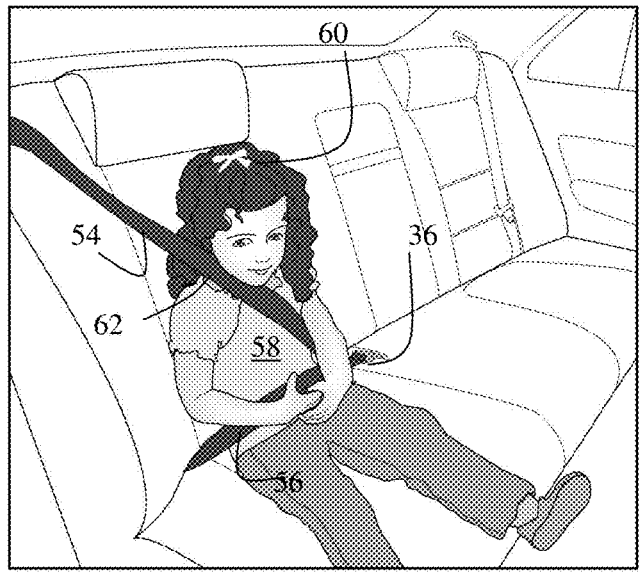

With reference to FIG. 3, it is well established that adult sized seat belt arrangements 10 of FIGS. 1a, 1b, 2a, 2b, are not appropriate for smaller children 60, since the diagonal sash section 54 of the belt 12 tends to rub against the child's neck 62 or face, and the lap belt 56 section rides too high, and pushes of the child's stomach 58, since the clasp 36 is invariably on a flexible rod that holds the seat belt in too high a position above the child's lap. Indeed, even when the clasp 36 is on a short strap, it still has a tendency to ride up, due to the relatively small legs of the child and the wide separation between the anchor point and the clasp.

Figure 4:
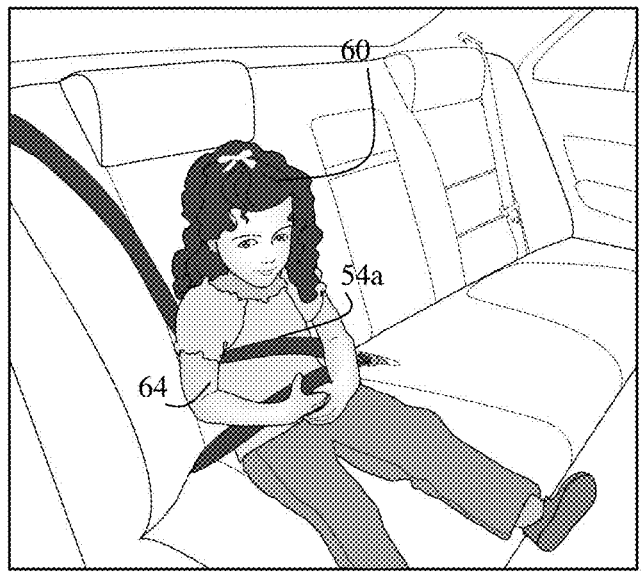

As shown in FIG. 4, sometimes smaller children fasten the diagonal sash section 54a under the arm 64. This solution is more comfortable for the smaller child 60, but results in both the sash section 54 and the lap section 56 lying across the smaller child's abdomen 58. If the vehicle stops suddenly, instead of retracting against the shoulder and rib cage which are relatively hard and protective, the seat belt retracts against the soft tissue and may cause internal damage.

Figure 5:
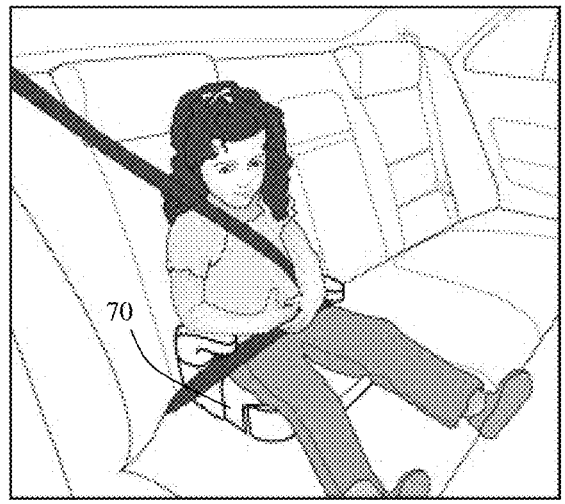

With reference to FIG. 5, booster seats 70 of various types have been proposed for use with three point seatbelts 12. The booster seat 70 raises the child 60, and this adjusts the position of the child 60 with respect both to the sash section 54 and the lap section 56 of the seatbelt 12. However, booster seats 70 have two inherent problems. Firstly, they are relatively bulky and when stored in the trunk of the car to make room for adult passengers, take up a lot of space. Secondly, some older children/young adults, may be self conscious about using something they consider babyish.

Embodiments of the present invention address these issues.

Figure 6:
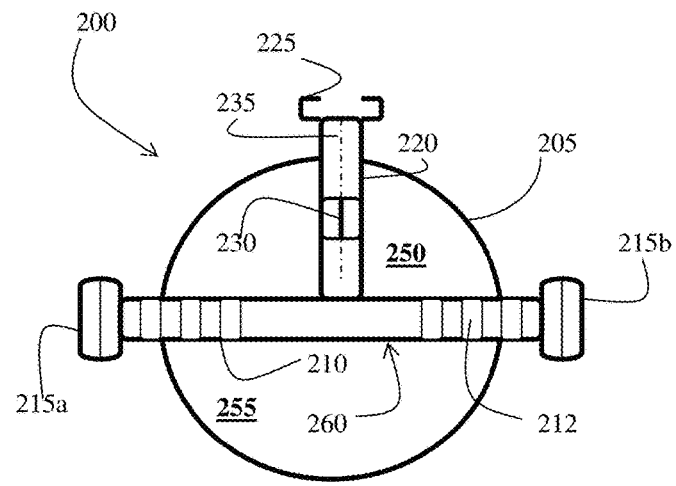

With reference to FIG. 6, a first embodiment of the present invention is schematically shown. The embodiment consists of an apparatus 200 that consists of a mat 205 to which a strap 220 is attached. This strap 220 is intended to engage the sash section 54 of a seatbelt 12 of a standard seatbelt arrangement 10. Also attached to the apparatus 200 are side catches 215a, 215b, that engage the lap section 36 of the seat belt 12 and pull it downwards, towards the seat 20 and the legs of a child occupant 60 sitting on the mat 205 and hold the seatbelt 12 down on each side of the child 60. The strap 220 is provided with a clip 225 for adjustably clipping sash section 54 of the seatbelt 12, so that the sash section 54 of the seatbelt 12 is held at an appropriate height to lie across the shoulder 64 of the child 60, and not against the neck 62 of the child 60. Apparatus 200 is shown as including a circular mat 205, but it will be appreciated that the mat 205 may be oblong, square or substantially any shape. In some embodiments, the mat 205 may be fabricated from nylon or other tough fabric so that it may be folder or rolled away when not in use. In other embodiments, the mat 205 may be fabricated from two or more sections that are hinged together, allowing the apparatus 200 to be folded. Apparatus 200 of the invention overcomes at least two disadvantages of booster seats 70. Firstly, the apparatus 200 is far less bulky than a booster seat 70, and therefore may be carried in a schoolbag or satchel by the child, in a mother's handbag, or stored in the glove compartment or under the front seats of the vehicle. If stored in the trunk of the vehicle, it nevertheless takes up much less room than conventional booster seats 70. Additionally, the apparatus 200 is more discrete than a booster seat 70 and is therefore perceived as less childish by the smaller child 60, and therefore more likely to be used by a child who is older but nevertheless too short for unaided use of an adult seatbelt 12.

The mat 205 itself may be fabricated from substantially any material. Preferably at least a widthwise strap 210 and the strap 220 for engaging the sash section 54 of the seatbelt 12 are fabricated from nylon, or other tough fabric, or from leather, for example. The widthwise strap 210 may, however, be a steel strip, for example. In preferred embodiments, the width wise strap 210 of the mat 205 is provided with a number of loops 212 to which the side catches 215a, 215b may alternatively be coupled. In this manner, the effective width of the apparatus 200 may be adjusted to the width of the pelvises of children of different sizes, or may be periodically adjusted to that of a child as he/she grows or by different children of different sizes.

With reference to FIG. 7a-7d, the side catches 215a, 215b shown in FIG. 6, may be shackles 215c, 215d or clips 80, 90 that may be opened to allow insertion of the seat belt 12, and then closed to hold the seatbelt 12. There are very many easily opened and closed shackles used that can be used to engage and hold the seatbelt 12 in place over the legs of the occupant. In addition to a purposely designed shackle for the apparatus 200, some easily opened and closed commercially available shackles are designed for rock-climbing and are sufficiently strong for restraining an occupant in a head on collision. Other types of side catches 215 may be employed. For example, clip 80 shown in FIG. 7c has a loop 82 for a seatbelt 12, into which the seatbelt 12 may be slid and removed by pressing on a sprung loaded flap 84. In FIG. 7d, a split buckle 90 is shown, having a gap 92 through which a seatbelt 12 may be threaded, and then straightened in slot 94 and restrained therein by broken strip 96. The strip 98 on the other side of the split buckle 90 may be solid if permanently fixed to apparatus 200, or may be provided with a gap 92b.

Referring to FIG. 7e, preferably, however, the side catch is an open, typically flattened, C shaped clip 100, enabling the seatbelt to be easily positioned and disengaged, with one hand.

With reference to FIG. 8, a child 60 sitting on the apparatus 200 of FIG. 6 is shown, illustrating how the apparatus 200 enables the adult three-point seatbelt arrangement 10 to be adjusted to comfortably secure a child 60. Referring to FIG. 8, mat 205 is placed on the seat 22 of the vehicle, with strap 220 positioned rearwards. Strap 220 extends upwards and the clip 225 coupled thereto may be clipped onto sash section 54 of seatbelt 12, above the shoulder 64 of the child 60. In this way, the sash section 54 is held downwards and correctly positioned across the shoulder of the child. The side catch 215a (215b not shown) are proximate to the thighs of the child 60 and hold the lap section 54 of the strap down across the lap.

The clip 215 and side catches 215 may vary considerably within the scope of the invention, and some embodiments consists of hook arrangements, rods threaded through two eyes and the like.

The strap 220 may be riveted or sewn to the mat 205 and the clip 225 may be attached to the strap 220 by a buckle 230 whose tongue may be threaded through any of a number of eye holes 235 punched through the strap 220. In other embodiments, other adjustment means, may be used to appropriately size the strap.

In other embodiments, the mat 205 may be rigid. Preferably the rigid mat is foldable for ease of storage. The side catches 215a, 215b may be attached to the mat by extendible arms or straps to allow the apparatus to be sized to occupants of different sized pelvises.

Although described hereinabove for use by children, it will be appreciated that the apparatus 200 may be used by shorter adults as well.

Figure 9:
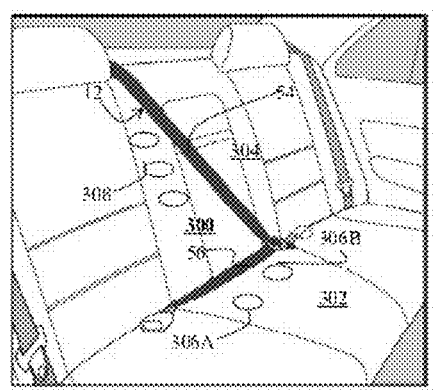

With reference to FIG. 9, a further embodiment is shown in which the system for engaging the seatbelt and adjusting it for child or generally smaller occupants is part of the car chair 300, which may be a front seat, a back seat, or part of a back bench for two or three passengers. For purposes of illustration, the car chair 300 illustrated is the middle sitting position of the backseat of a vehicle, which is designed for two or three occupants.

The car chair consists of a seat 302 and a back 304, which are generally upholstered and may have rigid frames. The seat 302 is provided with side catches 306A, 306B attached to the seat 302 for engaging a lap section 56 of a seat belt 12 and directing it across thighs of an occupant (60 FIG. 8), and a clip 308 attached to the back 304 of the car chair 300 for engaging a shoulder strap 54 of the seatbelt 12 and directing it across the shoulder 64 of the occupant 60.

In some embodiments the side catches 306A, 306B comprise C clips (e.g. 100 FIG. 7e) detachably attachable to loops in the fabric of the seat 302 upholstery. In other embodiments the side catches 306A, 306B comprise shackles 215c, 215d, open buckles 90, hooks and clips 80 detachably attachable to loops in the fabric or permanently attached to the fabric of the seat 302.

In some embodiments the side catches 306A, 306B comprise straps provided with one part of a hook and loop fabric fastener (as developed by Velcro™), to detachably attach to a second part of the hook and loop fastener sewn to fabric of the seat 302.

In some embodiments the clip 308 attached to the back 304 of the seat, for engaging the shoulder sash 54 part of the seatbelt 12 comprises a loop permanently attached to fabric of the seat back 304. In other embodiments the clip 308 attached to the back 304 of the car chair 300 for engaging the shoulder sash 54 part of the seat belt 12 comprises a strap provided with one part of a hook and loop fabric fastener (Velcro™) to detachably attach to a second part of the hook and loop fastener sewn to fabric of the seat back 304. In some embodiments the clip 308 attached to the chair back 304 for engaging the shoulder sash 54 section of the seat belt 12 comprises a substantially vertical series of cloth loops permanently attached to fabric of the seat back 304 and a detachable clip e.g. 215, 90, 100 (FIG. 7) for engaging one of the cloth loops and the shoulder sash section 54 of the seat belt 12.

With reference to FIGS. 10 to 15 another preferred embodiment is shown from various perspectives. The most preferred embodiment is fully shown in design application no. FIG. 1a 29/516,718 filed on 5 Feb. 2015.

In the preferred embodiment, an apparatus 1200 that includes a rigid oblong mat 1205 fabricated from two sections 1205A, 1205B that are hinged together by a hinge 1210, allowing the apparatus 1200 to be folded like a book. The apparatus 1200 has a strap 1220 attached. This strap 1220 is intended to engage the sash section 54 of a seatbelt 12 of a standard seatbelt arrangement and is provided with a clip 1225 for adjustably clipping sash section 54 of the seatbelt 12, so that the sash section 54 of the seatbelt 12 is held at an appropriate height to lie across the shoulder 64 of the occupant 60, and not against the neck 62 of the occupant 60.

The occupant 60 may be a child or may be a short adult, it being noted that often the three point passenger seatbelts installed in vehicles do not properly restrain shorter adults, since the sash part of the seatbelt may rub against the neck instead of lying over the shoulder.

Also attached to the apparatus 1200 are side catches 1215a, 1215b, that engage the lap section 36 of the seat belt 12 and pull it downwards, towards the seat 20 and the legs of an occupant 60 sitting on the mat 205 and hold the seatbelt 12 down on each side of the occupant 60.

As shown in FIGS. 13-15, apparatus 1200 of the invention may be folded. Consequently apparatus 1200 overcomes at least two disadvantages of booster seats 70. Firstly, the apparatus 1200, particularly when folded (FIGS. 123-145) is far less bulky than a booster seat 70, and therefore may be conveniently carried and stored. For example, the apparatus 1200 may be put into a schoolbag or satchel of a child, or carried in a mother's handbag. It may be stored in the glove compartment or under the front seats of a vehicle, for example. If stored in the trunk of the vehicle, the apparatus 1200 nevertheless takes up much less room than conventional booster seats 70. Additionally, the apparatus 1200 is more discrete than a booster seat 70 and is therefore perceived as less childish by the smaller child 60, and therefore more likely to be used by a shorter adult or by a child who is older but nevertheless too short for unaided use of a standard adult seatbelt 12.

The rigid mat 1205 itself may be fabricated from substantially any material. Preferably the strap 1220 for engaging the sash section 54 of the seatbelt 12 is fabricated from nylon, or other tough fabric, or from leather, for example.

The side catches 1215a, 1215b are mounted on strips 1210a, 1210b that may be rigid and may be fabricated from a tough plastic or from steel strip, for example, but in some embodiments, may be rigid yet bendable. In other embodiments, the strips 1210a, 1210b are flexible straps that may be manufactured from nylon, leather, metal links, and the like. The strips 1210a, 1210b may be extended from the mat 1205 by a variable amount and locked in place by locks 1250a, 1250b at varying extensions, to allow the apparatus to be compacted for storage and sized to occupants of different sized pelvises, thereby appropriately sizing the effective width of the apparatus 1200 by adjusting the separation of the side catches 1215a, 1215b by extending the strips 1210a, 1210b from the mat 1205 by varying amounts to adjust apparatus 1200 to the width of the pelvises of occupants of different sizes, such as different children, or to periodically adjust to a child as he/she grows, for example.

With reference to FIG. 15, the side catches 1215a, 1215b may be open, typically flattened, C shaped clips 1100, enabling the seatbelt to be easily positioned and disengaged, with one hand. In some embodiments, the side catches 1215a, 1215b consist of metal C clips that are positioned into the mould used for fabricating plastic strips 1210a, 1210b, so the metal side catches 1215a, 1215b are integral to the plastic strips 1210a, 1210b. However it will be appreciated that the clip 1215 and side catches 1215 may vary considerably within the scope of the invention.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. An apparatus for adapting an adult three-point seatbelt of a vehicle for use by a short occupant of a seat; wherein the seatbelt comprises a belt that extends from above shoulder height of the occupant to an anchor point connected to chassis of the vehicle at seat level, and a clasp attached to the chassis on an opposite side of the occupant from the anchor point, such that the belt may be drawn downwards and across the occupant to engage the clasp, thereby restraining the occupant with both a sash section and a lap section of the seatbelt, the apparatus comprising:

a mat with side catches mounted on arms that extend from said mat a variable amount for engaging the lap section of the seatbelt and for holding it down over the legs of the occupant, and a strap fixed to said mat, said strap having a clip at a distal end thereof, and said strap arranged to extend behind the occupant, said clip adjustably engaging the belt extending from above shoulder height of the occupant, to bring the sash section of the belt down, over the shoulder of the occupant, wherein separation of the side catches is adjustable to adjust said apparatus to occupants of different widths.

2. The apparatus of claim 1, wherein the mat comprises at least two sections that are hinged together enabling the mat to be folded for storage.

3. The apparatus of claim 1, wherein the side catches are selected from the group comprising shackles, open buckles, and hooks.

4. The apparatus of claim 3, wherein the side catches are open C shaped hooks.

5. The apparatus of claim 1 wherein effective length of said strap may be adjusted by a buckle.

6. The apparatus of claim 1, wherein said clip comprises a locking magnetic element.

7. The apparatus of claim 1, wherein the arms are selectively extendible from the mat and retractable into the mat.

8. The apparatus of claim 7, wherein the arms are rigid.

9. The apparatus of claim 7, wherein the arms are flexible.

10. The apparatus of claim 7, wherein the arms comprise floppy straps.

11. The apparatus of claim 7, wherein the arms comprise plastic and the side catches comprise metal c clips cast into ends of the arms.

12. The apparatus of claim 7, wherein the arms are lockable at different extended positions.

* * * * *